US008169985B2

(12) United States Patent
Chou et al.

(10) Patent No.: US 8,169,985 B2
(45) Date of Patent: May 1, 2012

(54) COORDINATED BEACON PERIOD (BP) MERGING FOR DISTRIBUTED WIRELESS NETWORKS

(75) Inventors: Chun-Ting Chou, Elmsford, NY (US); Javier Del Prado Pavon, Mougins (FR); Sai Shankar Nandagopalan, San Diego, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1210 days.

(21) Appl. No.: 11/816,333

(22) PCT Filed: Feb. 14, 2006

(86) PCT No.: PCT/IB2006/050485
§ 371 (c)(1),
(2), (4) Date: Aug. 15, 2007

(87) PCT Pub. No.: WO2006/087677
PCT Pub. Date: Aug. 24, 2006

(65) Prior Publication Data
US 2008/0259847 A1    Oct. 23, 2008

Related U.S. Application Data

(60) Provisional application No. 60/653,157, filed on Feb. 15, 2005, provisional application No. 60/718,898, filed on Sep. 20, 2005.

(51) Int. Cl.
*H04W 4/00* (2009.01)
(52) U.S. Cl. .......... 370/338; 370/350; 455/500
(58) Field of Classification Search .......... 370/328, 370/338, 350; 455/500, 502
See application file for complete search history.

(56) References Cited

U.S. PATENT DOCUMENTS

| | | | |
|---|---|---|---|
| 2005/0064818 A1* | 3/2005 | Assarsson et al. | 455/41.2 |
| 2005/0169292 A1* | 8/2005 | Young | 370/432 |
| 2005/0249173 A1* | 11/2005 | Salokannel et al. | 370/338 |
| 2006/0040701 A1* | 2/2006 | Long et al. | 455/525 |
| 2008/0298329 A1* | 12/2008 | Mo et al. | 370/338 |

* cited by examiner

*Primary Examiner* — Jung Park
(74) *Attorney, Agent, or Firm* — Larry Liberchuk

(57) ABSTRACT

The application describes a method to merge two wireless networks in which each terminal gets a beacon slot within the beacon period. In order to merge two networks, the beacon slots have to be time-coordinated such that the beacon slots of the first network are completed before the beacon slots of the second network begin. The method includes transmitting a beacon frame having a beacon period switch information element which instructs the neighboring terminals in the first network of the need to merge, provides clock synchronization information; provides the time of the merge; and informs the neighboring terminals which beacon slot to occupy in the beacon period of the merged network. In order to deal with hidden terminals, the information needs to be forwarded terminal-to-terminal within each network.

16 Claims, 4 Drawing Sheets

COORDINATED BEACON PERIOD (BP) MERGING FOR DISTRIBUTED WIRELESS NETWORKS

This Application claims the benefit of U.S. Provisional Application No. 60/653,157, filed on Feb. 15, 2005, and U.S. Provisional Application No. 60/718,898, filed on Sep. 20, 2005.

Wireless communication technology continues to improve, making the wireless medium a viable alternative to wired and optical fiber solutions. As such, the use of wireless devices in data and real-time communications continues to increase. Illustrative devices include mobile telephones, portable computers in wireless networks (e.g., wireless local area networks (WLANS)), stationary computers in wireless networks, and portable handsets, to name only a few.

One type of wireless network is a distributed wireless network. In a distributed wireless network, wireless devices or stations (STAs) share coordination of the network. In general, these devices may transmit beacons periodically to provide information (e.g., clock synchronization) useful for coordination of devices in the network. This is in contrast to a centralized wireless network where an access point (AP) or base station coordinates the communication within the network.

Because of their mobility, one or more devices of one distributed wireless network may operate in proximity to other devices in another wireless network. This can be deleterious to operation of each wireless network, due to collisions of transmitted beacons or data, or both, from the nearby network. These collisions are mainly caused by lack of synchronization/coordination of beacon and data transmissions between different wireless networks.

One way to address the noted problems of interfering distributed wireless networks involves merging of two networks that are not synchronized networks into one wireless network. While known merging techniques are beneficial, there are clear shortcomings and drawbacks associated with the known techniques.

One problem of known merging techniques results from hidden nodes or devices. Because devices of one group of the first network can be hidden (i.e., do not receive beacons) from another group of devices of the second network, these hidden devices are unaware of the need to merge the wireless networks. As a result, some devices of the first network will not merge into the second network. Accordingly, because some of the devices in the first network do not merge with the second network, collisions between beacons and data transmissions may continue.

What is needed is a wireless network and method that overcomes at least the shortcomings of the known networks described above.

In accordance with an example embodiment, a method includes transmitting a beacon frame having a beacon period switch information element (BPSwitchIE) from at least one of a plurality of wireless devices in a first wireless network to at least one other of the plurality of wireless devices in the first wireless network. The method also includes merging the first wireless network with a second wireless network.

In accordance with another example embodiment, a wireless system includes a first wireless network merged with a second wireless network, wherein the first wireless network including a plurality of wireless devices. At least one of the plurality of wireless devices is adapted to transmit a beacon frame having a beacon period switch information element (BPSwitchIE) to at least one other of the plurality of wireless devices.

The invention is best understood from the following detailed description when read with the accompanying drawing figures. It is emphasized that the various features are not necessarily drawn to scale. In fact, the dimensions may be arbitrarily increased or decreased for clarity of discussion. Wherever practical, like reference numerals refer to like features.

In the following detailed description, for purposes of explanation and not limitation, example embodiments disclosing specific details are set forth in order to provide a thorough understanding of the present teachings. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the example embodiments. Nonetheless, such devices, methods, systems and protocols that are within the purview of one of ordinary skill in the art may be used in accordance with the example embodiments.

As used herein, the terms 'a' or 'an' means one or more, and the term 'plurality' means at least two.

Figure 1:
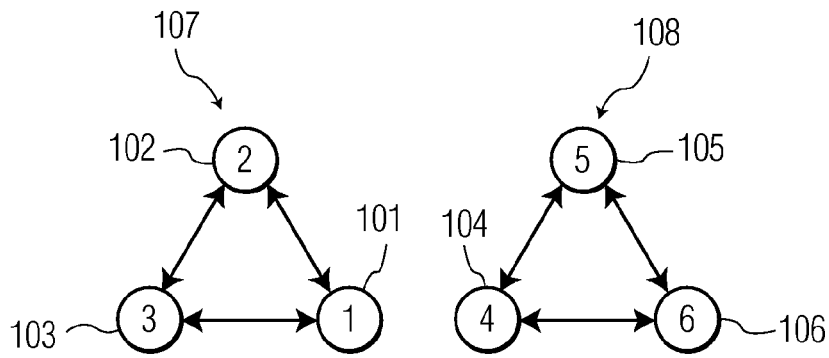
FIG. 1 is a conceptual diagram of two distributed wireless networks in accordance with an example embodiment.

FIG. 1 is a simplified schematic view of a first wireless network 107 and a second (neighboring) wireless network 108 in accordance with an illustrative embodiment. The first and second wireless networks 107, 108 are distributed wireless networks. In a specific embodiment, the first and second wireless networks include a medium access control (MAC) layer that functions in accordance with the WiMedia UWB MAC protocol of the WiMedia Alliance. The first wireless network 107 includes a first wireless station (STA) 101, a second wireless STA 102 and a third wireless STA 103. The second wireless network 108 includes a fourth wireless STA 104, a fifth wireless STA 105 and a sixth wireless STA 106. Notably, the terms STA and device may be used interchangeably herein.

Illustratively, the STAs 101-106 may be computers, mobile telephones, personal digital assistants (PDA), or similar device that typically operates in such networks. As indicated by the two-way arrows, the STAs may communicate bilaterally.

It is noted that only a few STAs are shown in each wireless network; this is merely for simplicity of description of the illustrative embodiments. Clearly, many other STAs may be used. Finally, it is noted that the STAs 101-106 are not necessarily the same. In fact, a plethora of different types of STAs adapted to function under the chosen protocol may be used within the networks 107, 108.

Initially, the first and second wireless networks 107,108 operate substantially independently. However, because the STAs of each network may be mobile, one or more of the STAs of one of the networks may come in proximity of the other network. For example, suppose the group of wireless STAs 101-103 of the first network travel within the communication range of at least one of the STAs 104-106 of the second network. Thereby, the STAs 101-103 may begin to receive beacons from one or more of the STAs 104-106 and vice versa. However, one or more of the wireless STAs 106-108 of the second network 108 may be hidden from the wireless STAs 101-103 of the first network 107. As a result, one or more stations in the first network may not receive beacons from the wireless stations of the second wireless network 108.

When STAs of neighboring networks are in proximity of each other, collisions between the transmissions of beacons or data, or both, may then occur, for example due to the lack of clock synchronization. Additionally collisions may occur when one or more of the STAs of one network switch from one channel to a channel occupied by another wireless network. Regardless of the cause of the collisions, interference or disruption of service may result. Therefore, it may be useful for the first network 107 to merge with the second network 108 or vice versa.

In example embodiments, the merging of networks occurs in a coordinated manner to mitigate, if not eliminate, collisions.

Figure 2A:
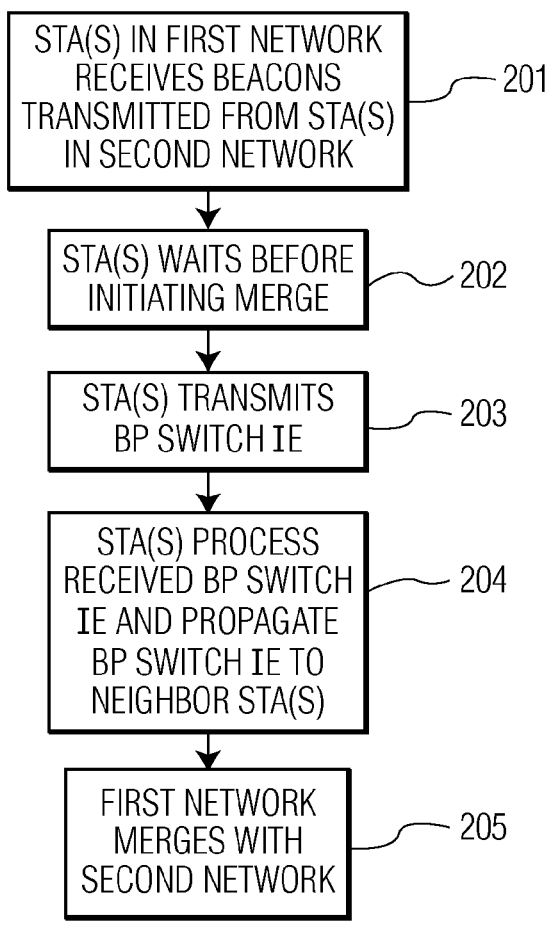
FIG. 2A is a simplified flow chart of a method in accordance with an example embodiment.

FIG. 2A is a simplified flow-chart illustrating a method of merging a first distributed wireless network with a second distributed wireless network in a coordinated manner according to an example embodiment. The wireless networks may be of the type described in conjunction with FIG. 1. As such, a concurrent review of FIGS. 1 and 2A is beneficial.

At step 201, an STA from a first network receives one or more beacons from an STA of a second network. Notably, more than one of the STAs of the first network may receive beacons from one or more of the STAs of the second network.

At step 202, the STAs of the first network and the second network wait or refrain from merging in order to ensure that the first network and second network, or groups of STAs therefrom, are not merely temporarily in close proximity to one another. If, after waiting for a number of superframes to pass, the networks or groups of STAs of the networks are no longer in close proximity, the method ceases as merging is not needed. Naturally, the method may continue at a later time at step 201 in the event that an STA of a first network or a group of STAs of the first network receive a transmission from one or more STAs of the second network.

Figure 2B:
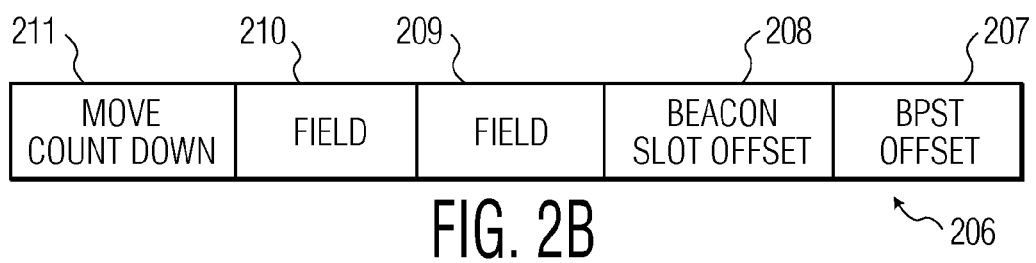
FIG. 2B is a simplified block diagram of a BPSwitchIE element in accordance with an example embodiment.

In the event that the device(s) of the first network stays in proximity to those in the second network, the STA transmits a beacon period switch information element (BPSwitchIE). As shown in FIG. 2B and as described more fully herein, the BPSwitchIE 206 may include a beacon period start time (BPST) offset field 207, a beacon slot offset field 208 and a beacon period move countdown field 211. The BPSwitchIE may also include additional fields 209, 210 for further information useful in the coordinate merge. Among other functions, the BPSwitchIE 206 instructs the neighboring STAs in the first network of the need to merge, provides clock synchronization information; provides the time of the merge; and informs the neighboring STAs which beacon slot to occupy in the beacon period of the merged network. Beneficially, this functions to coordinate the merge of the networks to substantially avoid collisions of beacons in beacon slots and data transmission.

Without the BPSwitchIE, devices in the first network that are unable to receive certain beacons will be unaware of the need to merge and the instructions related to the merge. For example, suppose the first wireless STA 101 and the second wireless STA 102 receive beacons from one of the wireless STAs of the second wireless network 108. Furthermore, suppose third wireless STA 103 is hidden, and does not receive beacons from the STAs of the second wireless network 108. In this case, the third wireless STA 103 would not be aware of the second wireless network 108, or of the merging of the first network 107 (i.e., STAs 101 and 102) with the second network 108. Once STAs 101 and 102 merge with the network 108, transmissions between STA 101 or STA 102 and 103 may be interrupted. In addition, the transmissions from the third wireless STA 103 may interfere with the communications within the merged wireless network.

In order to provide the BPSwitchIE to as many STAs of the first network 107, once a BPSwitchIE is received by an STA, the BPSwitchIE is propagated (retransmitted) to other STAs in the first network 107. This propagation occurs at step 204. Moreover, all STAs that receive the BPSwitchIE in turn include the BPSwitchIE in their respective subsequent beacons. Thus, over a number of superframes (e.g., during the countdown period of the merging) the likelihood increases that other devices in the first network 107 will become informed of the merge and of the time and instructions/logistics of the merge.

Continuing with the example noted above, suppose that STA 103 is hidden from STA 101, but does receive beacons from STA 102. During the propagation of the BPSwitchIE from STA 101 over the countdown period, STA 103 will likely receive the BPSwitchIE of STA 101 via STA 102 and thus be aware of the requirements of the merge of wireless networks 107 and 108. In a specific embodiment, STA 103 receives the BPSwitchIE during step 204 of the illustrative method. Beneficially, more STAs of the first network are aware of the merge, and there is less chance of interruption of service or interference from STA(s) unaware of the merge.

At step 205, after the indicated number of superframe frames of the countdown period have past, the first network 107 and the second network 108 merge to form a merged distributed wireless network that illustratively functions in accordance with the WiMedia UWB MAC protocol.

Figure 3:
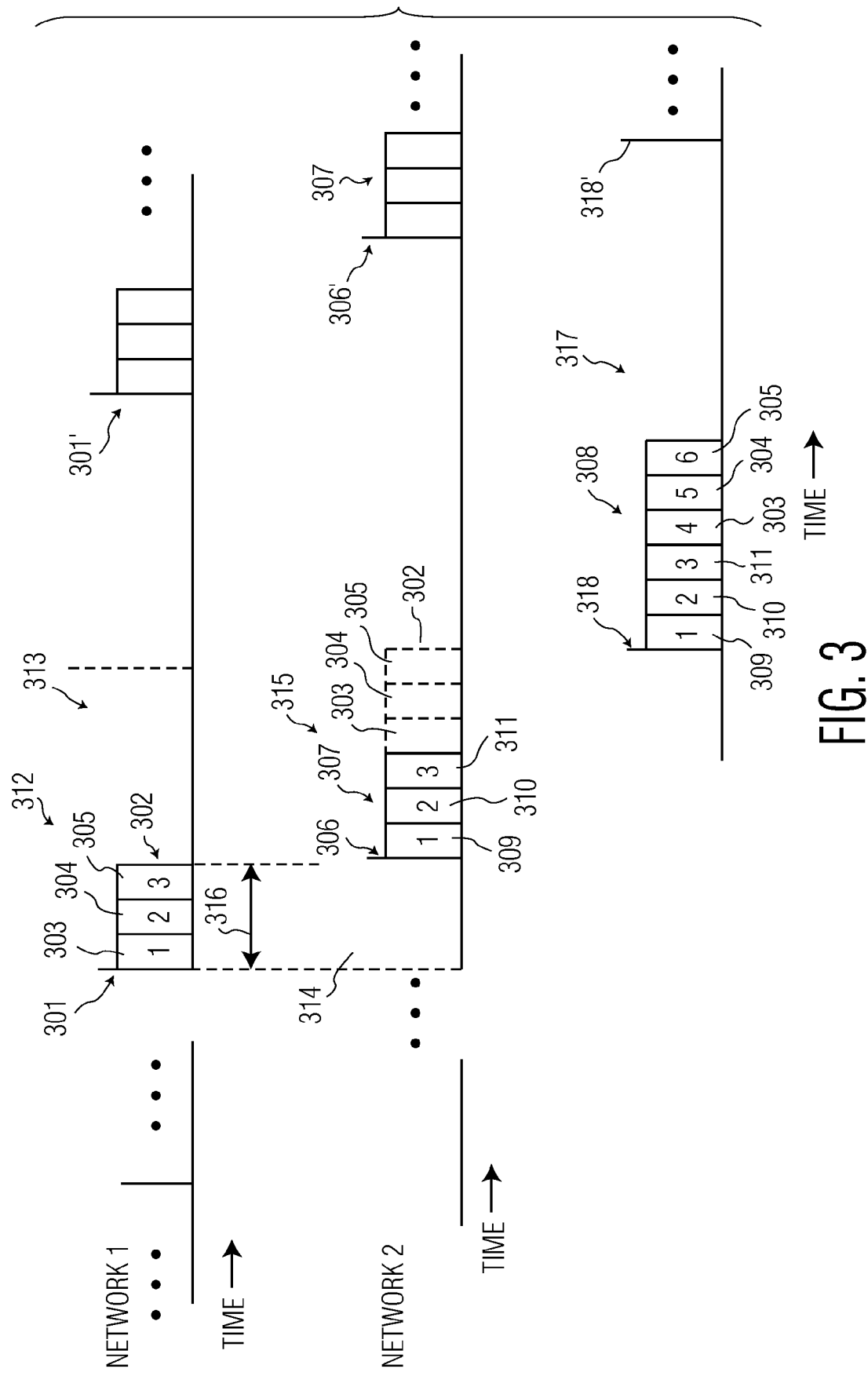
FIG. 3 is a simplified diagram of superframes of wireless networks in accordance with an example embodiment.

FIG. 3 is a conceptual view showing superframes of a first network, a second network and a merged network with respect to time. FIG. 3 may be reviewed in conjunction with FIGS. 1 and 2.

The first network includes a series of superframes with a first superframe starting at time 301 and the next superframe starting at time 301'. Each of the superframes includes a beacon period (BP) 302. As is well known, each wireless station of the first network is allocated a beacon slot in which to transmit its beacons. In the example embodiment of FIG. 3, the first slot 301 is allocated to a first wireless device (e.g., STA 101) of the first network, a second slot 302 is allocated to a second wireless device of the first network (e.g., STA 102) and a third slot is allocated to a third wireless device (e.g., STA 103) of the first wireless network.

The second network includes a series of superframes with a first superframe starting at time 306 and the next superframe starting at time 306'. Each superframe has a beacon period 307. Illustratively, the first slot 309 may be allocated to STA 104 of the second wireless network 108. Similarly, a second slot 310 may be allocated to STA 105 of the second wireless network 108 and a third slot 311 may be allocated to STA 106 of the second wireless network.

In operation, after the requisite number of superframes has passed before commencing the merge as provided by step 202, the merging procedure begins in accordance with certain rules of the example embodiments. First, the determination must be made is if the first network is to merge with the second network, or if the second network is to merge with the first network. In an example embodiment, if the beacon period start time (BPST) of another network (also referred to as the alien network) falls within the first half of a network's superframe, then the network will merge with the other (alien) network. In the present embodiment, the BPST of beacon period 307 in superframe 315 falls within the first half 313 of the superframe 312 of the first network. Thus, the first network will merge with the second network.

Before continuing with the next rule governing the merge, consider the superframe preceding the superframe 315. The BPST of beacon period 302 in superframe 312 falls within the second half 314 of preceding superframe, and thus according to a corollary to the above rule, the second network will not merge with the first network.

After the determination is made as to which network is to merge, the coordination of the beacon frames and beacon slots in the merged network must be carried out, again according to certain rules of the example embodiments.

One adjustment that must be made to avoid overlap of beacons is BPST offset. BPST offset is an adjustment of the start time of the beacon period in the MAC layer. For example, in superframe 312 of the first network, the beacon period 302 starts at the beginning 301 of the superframe. In superframe 315 of the second network, the beacon period 307 starts at the beginning 306 of the superframe. In absolute time, there is a delay 316 between the BPSTs of the first and second networks. Thus, in order for the BPST of the merged wireless network to be coordinated between the first and second wireless networks, the first wireless network must include a BPST offset in the BPSwitchIE that is equal to the delay 316.

In practice, one of the STAs of the first wireless network 107 (e.g., STA 101) provides the BPST offset in the BPST offset field of the BPSwitchIE. As noted previously, the BPSwitchIE is transmitted, updated and retransmitted from STAs to STAs in the first wireless network during the superframe countdown period, so the likelihood improves that most or all STAs of the first (merging) wireless network are apprised of the BPST offset value.

The BPST offset aligns the BPST of the first wireless network with the BPST of the second wireless network. Thus, without more, beacons from STAs from the first wireless network would be transmitted at the same time as beacons from STAs of the second wireless network in the merged wireless network. In order to complete the coordination and avoid the overlap of beacon transmission, the beacon slot offset is calculated and included in the beacon slot offset field of the BPSwitchIE transmitted to the STAs of the merging (first) wireless network.

Essentially, the beacon slot offset is an adjustment of the beacon slots of the merging STAs so that their beacon slots in the new merged network follow the beacon slots of the non-merging STAs. In the present example, the first three beacon slots 309-311 are occupied by three STAs in the second wireless network and the following three beacon slots for the merging three STAs from the first wireless network. Thus, the merging STAs will move from their original beacon slots 303-305 in beacon period 302 as shown by dotted line in the superframe 315 in beacon period 307. Again, the beacon slot offset, which is an increase of three (+3) in the present example, is included as a field in the BPSwitchIE.

While the calculation of the beacon slot offset is relatively straightforward, there is an additional consideration that must be accounted for when determining the offset. As described previously in connection with FIG. 1, suppose the first wireless STA 101 of the first wireless network receives beacons from the fourth and fifth STAs 104, 105 of the second network, but does not receive beacons from the sixth wireless station 106. If STA 101 were to determine the beacon slot offset on its own, the offset would be +2, as this station would not recognize that another STA was present. Of course, the required slot offset is +3 and by setting the beacon slot offset as +2, the new beacon slot of STA 101 overlaps with the beacon slot of STA 106. As such, beacon collisions occur in the merged wireless network, which is undesirable. However, suppose the second wireless STA 102 receives beacons from the fourth, fifth and sixth wireless STAs 104-106 in the second network 108. In this case, the correct beacon slot offset is determined to be +3 and is set accordingly to provide coordination in the merge.

In the example embodiment, the beacon slot offset is included in the BPSwitchIE transmitted and retransmitted during the countdown period with the beacons of the STAs 101-103. Each STA that receives the BPSwitchIE of the second wireless STA 102 will determine that the beacon slot offset provided by STA 102 is the larger value. Therefore, in accordance with the example embodiment, the beacon slot offset provided in subsequent beacon transmission will be the largest beacon slot offset provided by the neighboring STAs. As can be appreciated, by retransmitting the BPSwitchIE from one STA to another during the countdown period, there is a greater chance that most, if not all STAs of the merging network will receive the most accurate (largest) beacon slot offset.

After the determination of the BPST and beacon slot offset of the merged wireless network and its dissemination via BPSwitchIEs of the STAs of the merging wireless network, the STAs undergo the waiting/countdown period of a predetermined number of superframes of the wireless network. At the conclusion of the countdown, the wireless STAs of the first wireless network merge with the wireless STAs of the second wireless network. In the example embodiment, a superframe 317 of the merged wireless system begins at 318 with the beacon period 308 comprised of the beacon slots 303-305 and 309-311. The merged system then functions with the next superframe beginning at time 318'.

The BPSwitchIE includes a BP move countdown value in move countdown field of the BPSwitchIE. In an example embodiment, the move countdown is set to an initial value. In a specific embodiment, the move countdown is set at seven (7) superframes. In the event that no other factors call for an increase or decrease in the move countdown value, the STAs will decrement the move countdown by one (1) superframe and the STA will merge after the designated number of superframes have passed. However, the move countdown value may have to be incremented. For example, if a BPSwitchIE with larger BPST Offset is received from another STA, or a larger beacon slot offset is received from another STA(s), the STA will reset the move countdown to the initial value (e.g., seven superframes). This allows the transition period before the merge to be of sufficient length to allow stations to propagate the new information via BPSwitchIEs.

Figure 4:
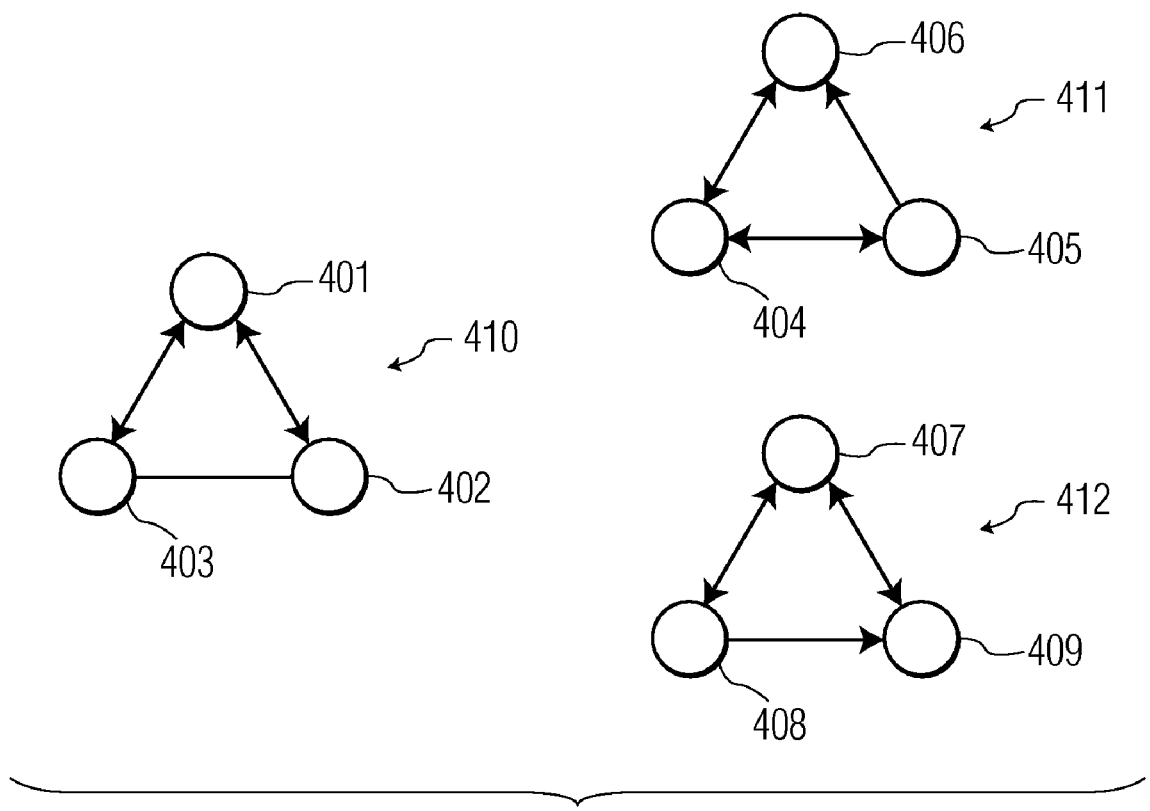
FIG. 4 is a conceptual diagram of three distributed wireless networks in accordance with an example embodiment.

FIG. 4 is a conceptual diagram showing three wireless networks in proximity with one another. The first wireless network 410 includes STAs 401, 402 and 403. The second wireless network 411 includes STAs 404, 405 and 406. The third wireless network 412 includes STAs 407, 408 and 409. Like the networks described in connection with the example embodiment of FIG. 1, the wireless networks 410-412 are distributed networks and illustratively include a WiMedia UWB MAC layer. As many of the characteristics of the wireless networks and the STAs of FIG. 4 are common to those of the wireless networks and STAs described in connection with FIG. 1, details thereof are omitted so as to avoid obscuring the description of the present example embodiment.

As noted previously, because of hidden nodes and other issues, certain STAs of one wireless network may be in contact with STAs of the other wireless networks, while others may not. For example, suppose STA 401 of the first wireless network receives a beacon from STA 404 of the second wireless network 411 but does not receive beacons from STAs of the third wireless network 412. Thus, STA 401 will be aware of the second wireless network, but will be unaware of the third wireless network. Similarly, suppose STA 402 of the first wireless network receives a beacon from the STA 407 of the third wireless network and thus is aware of the third wireless network. As described presently, methods of an example embodiment are useful in ensuring the coordinated merge of the networks as needed.

Figure 5:
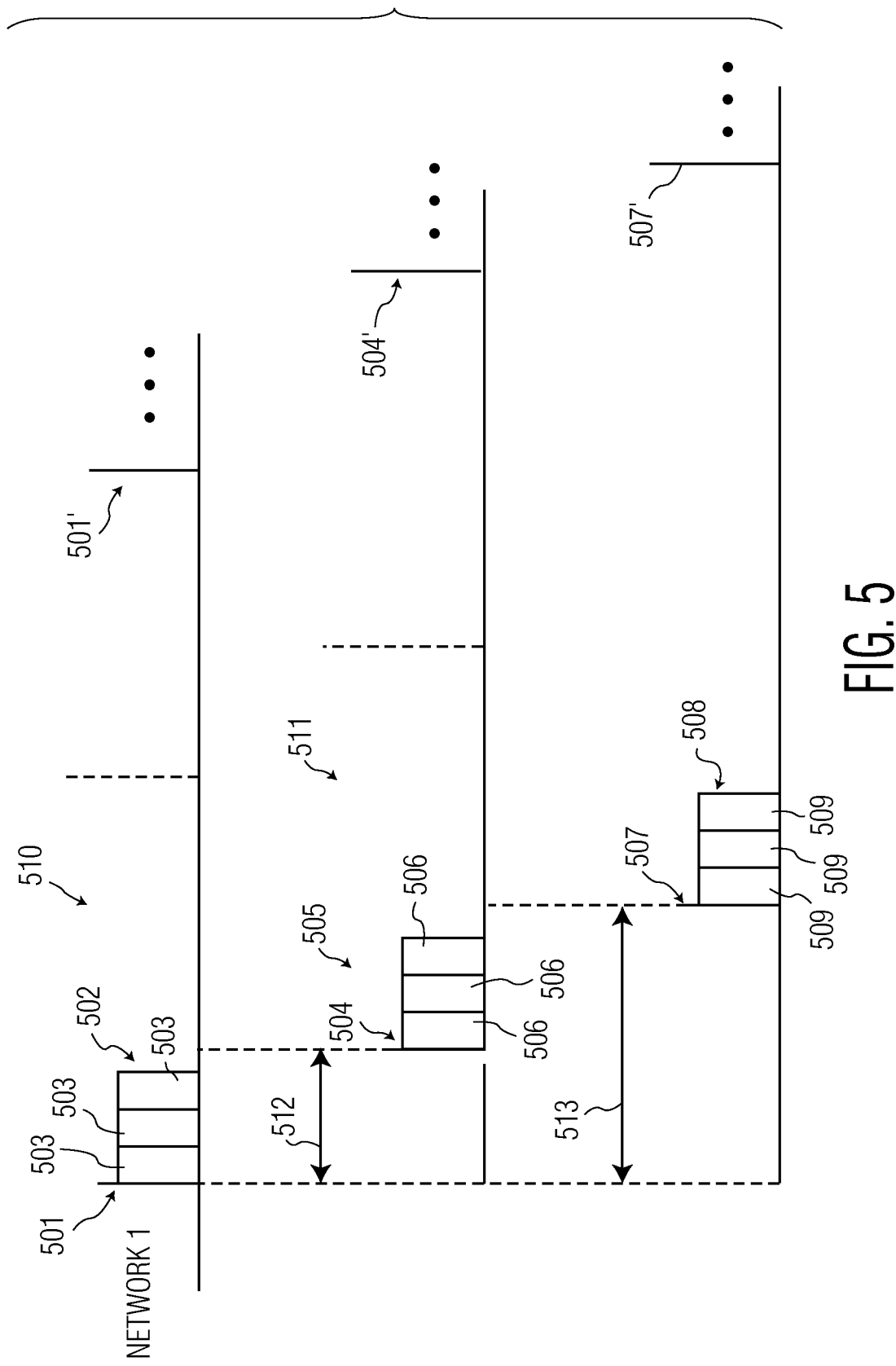
FIG. 5 is a simplified diagram of superframes of wireless networks in accordance with an example embodiment.

FIG. 5 shows the superframes of each of the first, second and third wireless networks 410-412 and is useful in understanding the dynamics of the merging of the wireless networks. The first wireless network 410 has a series of superframes with a first superframe starting at time 501, another superframe starting at 501'.

Each superframe of the network 410 includes a beacon period 502 with beacon slots 503. The second wireless network 411 has a superframe with a first superframe starting at time 504 and subsequent beacon frames starting at times 504', etc. Each superframe of the second network 412 includes a beacon period 505 with beacon slots 506. Finally, the third wireless network 412 has superframes with a first superframe starting at time 507 and subsequent frames with starting times 507'. Each superframe of the third network includes a beacon period 508, with beacons slots 509.

The merging sequence of an example embodiment is as follows. It is noted that the merging rules described in previous example embodiments apply. However, when merging more than one wireless network with another wireless network, some modification of the rules may be needed. For example, as noted previously, suppose STA 401 of the first wireless network receives a beacon from STA 404 of the second wireless network but does not receive beacons from the third wireless network. Thus, STA 401 will be aware of the second wireless network, but will be unaware of the third wireless network. Similarly, suppose STA 402 of the first wireless network only receives a beacon from the STA 407 of the third wireless network and thus is only aware of the third wireless network.

From beacons received from STA 404, STA 401 will determine that the BPST of beacon period 505 in the second network 411 falls within the first half 510 of its superframe and will send a BPSwitchIE indicating that a merge to the second network 411 is mandated. However, STA 402 will receive a beacon from STA 407 indicating that the BPST of beacon period 508 the third network 412 falls within the first half 510 of its superframe. Thus, under the present rules, the STA 402 will send a BPSwitchIE mandating that each device of the first wireless network merges to the third wireless network. Therefore, a conflict arises that must be remedied. In particular, due to the conflict, rather than all devices of the first wireless network 410 merging to the same wireless network, some will merge to the second wireless network 411 and some will merge to the third wireless network 412. Clearly, two operating networks will remain and collisions between transmissions of the remaining networks will likely occur.

In order to ensure that each STA of the first network 410 merge with the third network, the method of an example embodiment requires that the network merges to the neighboring (alien) network requiring the largest BPST offset. In the present example embodiment, the BPST offset 512 between the beacon period start times of the first and second wireless networks is less than the BPST offset 513 between the first and the third wireless networks. Thus, all wireless STAs of the first wireless network 410 must merge with the third wireless network 412.

The merger of the STAs of the second wireless network 411 proceeds as follows. The STAs 404-406 will receive beacons from STAs of the third wireless network 412 indicating the BPST. Because the BPST of beacon period 507 in the third wireless network is within the first half 511 of the superframe of the second wireless network, STAs of the second wireless network will merge with the third wireless network.

Notably, during the merge countdown period, the STAs of the first, second and third wireless networks 410-412 exchange BPSwitchIEs including the BPST offset and the BP slot offset as determined according to the rules described above. Likely, most, if not all, STAs will gather the correct information and merge at the appropriate time in the coordinated manner provided by the rules.

In view of this disclosure it is noted that the various methods and devices described herein can be implemented in hardware and software. Further, the various methods and parameters are included by way of example only and not in any limiting sense. In view of this disclosure, those skilled in the art can implement the present teachings in determining their own techniques and needed equipment to effect these techniques, while remaining within the scope of the appended claims.

The invention claimed is:

1. A method, comprising:
transmitting a beacon frame having a beacon period switch information element (BPSwitchIE) from a first wireless device in a first wireless network to a second wireless device in the first wireless network;
providing a beacon slot offset in the beacon frame, wherein the beacon slot offset is chosen from among a plurality of beacon slot offsets of a plurality of wireless devices including the first and second wireless devices and is the beacon slot offset with the greatest value;
retransmitting the BPSwitchIE in another beacon frame from the second wireless device in the first wireless network; and
merging the first wireless network with a second wireless network, based on the BPSwitchIE.

2. The method as recited in claim 1, further comprising: providing a beacon period move countdown in the beacon frame.

3. The method as recited in claim 1, further comprising: merging a third wireless network with the first and the second wireless networks.

4. The method as recited in claim 3, wherein the merging of the first and third wireless networks with the second wireless network is substantially simultaneous.

5. The method as recited in claim 1, further comprising, after the transmitting, retransmitting the BPSwitchIE before the merge.

6. The method as recited in claim 5, wherein the retransmitting is repeated by wireless devices in the first wireless network.

7. The method as recited in claim 1, wherein the second wireless network has a beacon period start time that is in a first half of a superframe of the first wireless network.

8. A method comprising:
transmitting a beacon frame having a beacon period switch information element (BPSwitchIE) from at least one of a plurality of wireless devices in a first wireless network to at least one other of the plurality of wireless devices in the first wireless network;

merging the first wireless network with a second wireless network and merging a third wireless network with the first and the second wireless networks;

wherein a first wireless device of the plurality of wireless devices in the first wireless network determines a first beacon period start time offset with respect to the third wireless system, and a second wireless device of the first wireless network determines a second beacon period start time offset that is greater than the first beacon period start time offset, and the first wireless device sets the first beacon period offset to equal the second beacon period start time offset.

9. A wireless system, comprising:

a first wireless network to be merged with a second wireless network based on a beacon period switch information element (BPSwitchIE);

a first wireless device in the first wireless network for transmitting a beacon frame including the BPSwitchIE, the beacon frame includes a beacon slot offset and is chosen from among a plurality of beacon slot offsets of a plurality of wireless devices including the first and second wireless devices and is the beacon slot offset with the greatest value; and a second wireless device in the first wireless network receiving the beacon frame including the BPSwitchIE and retransmitting the BPSwitchIE in another beacon frame.

10. The wireless system as recited in claim 9, wherein the beacon frame includes a beacon period move countdown.

11. The wireless system as recited in claim 9, further comprising: a third wireless network to be merged with the second wireless network and the first wireless network.

12. The wireless system as recited in claim 11, wherein the first and third wireless networks are merged with the second wireless network substantially simultaneously.

13. The wireless system as recited in claim 11, wherein the first, second and third wireless networks are distributed wireless networks.

14. The wireless system as recited in claim 9, wherein the BPSwitchIE is retransmitted from wireless devices of the first network prior to merging the first and second wireless networks.

15. The wireless system as recited in claim 14, wherein a first wireless device of the plurality of wireless devices in the first wireless network determines a first beacon period start time offset with respect to the second wireless system, a second wireless device of the first wireless network determines a second beacon period start time offset with respect to the third wireless network that is greater than the first beacon period start time offset, and the first wireless device sets the first beacon period offset to equal the second beacon period start time offset.

16. The wireless system as recited in claim 15, wherein the BPSwitchIE is transmitted by wireless devices of the first, and second wireless networks.

* * * * *